US012761887B1

(12) United States Patent
Shekel et al.

(10) Patent No.: US 12,761,887 B1
(45) Date of Patent: Oct. 13, 2026

(54) APPARATUS AND METHODS FOR GENERATION OF AN INTERMEDIATE REPRESENTATION FOR ARTIFICIAL INTELLIGENCE CENTRIC ARCHITECTURES

(71) Applicant: NeuReality Ltd., Caesarea (IL)

(72) Inventors: Yuval Shekel, Raanana (IL); Yariv Aridor, Zichron-Yaakov (IL)

(73) Assignee: NeuReality Ltd., Caesarea (IL)

( * ) Notice: Subject to any disclaimer, the term of this patent is extended or adjusted under 35 U.S.C. 154(b) by 205 days.

(21) Appl. No.: 18/409,954

(22) Filed: Jan. 11, 2024

Related U.S. Application Data

(60) Provisional application No. 63/484,855, filed on Feb. 14, 2023.

(51) Int. Cl.
*G06F 8/41* (2018.01)

(52) U.S. Cl.
CPC .............. *G06F 8/443* (2013.01); *G06F 8/433* (2013.01)

(58) Field of Classification Search
CPC ................................. G06F 8/443; G06F 8/433
See application file for complete search history.

(56) References Cited

U.S. PATENT DOCUMENTS

| | | | | |
|---|---|---|---|---|
| 6,077,313 | A * | 6/2000 | Ruf | G06F 8/433 717/155 |
| 10,789,544 | B2 * | 9/2020 | Fiedel | G06N 20/00 |
| 10,901,715 | B1 * | 1/2021 | Raiman | G06F 9/4552 |
| 10,929,748 | B1 * | 2/2021 | Morten | G06N 3/08 |
| 11,080,026 | B1 * | 8/2021 | Kogelman | G06F 8/34 |
| 11,132,402 | B2 * | 9/2021 | Shi | G06F 16/284 |
| 11,373,088 | B2 | 6/2022 | Bleiweiss et al. | |
| 11,467,835 | B1 * | 10/2022 | Sengupta | G06F 9/3877 |
| 11,716,257 | B1 | 8/2023 | Khermosh et al. | |
| 12,423,074 | B1 * | 9/2025 | Fan | G06F 9/54 |
| 2019/0155850 | A1 * | 5/2019 | Shi | G06F 16/9024 |
| 2019/0179638 | A1 * | 6/2019 | Hao | G06F 16/9024 |
| 2021/0248115 | A1 | 8/2021 | Jones et al. | |
| 2022/0092439 | A1 * | 3/2022 | Liu | G06N 3/08 |
| 2022/0124543 | A1 | 4/2022 | Orhan et al. | |

(Continued)

FOREIGN PATENT DOCUMENTS

| | | | | |
|---|---|---|---|---|
| CN | 107408051 A * | 11/2017 | | G06F 8/447 |
| EP | 3624390 A1 * | 3/2020 | | G06F 8/433 |

*Primary Examiner* — Daxin Wu
(74) *Attorney, Agent, or Firm* — M&B IP Analysts, LLC

(57) ABSTRACT

A compiler compiles, for example, a deep learning (DL) model for artificial intelligence (AI) centric architectures, generating a control graph intermediate representation (IR). The IR denotes compute nodes and control nodes, and edges denote the control flow between the nodes. A compute node, represented by a circle on the graph, encapsulates a computation (e.g., operation) to be executed on a compute (e.g., accelerator) device. A control node, represented by a diamond on the graph, encapsulates the logic to decide on the next compute node to execute (e.g., in case of conditional execution) and to enqueue job requests into an input queue of a compute device to execute that compute node. As execution may occur on different compute devices, the compiler is configured to operate without assuming a shared memory address space between different compute devices, making no assumption of a single program counter.

19 Claims, 12 Drawing Sheets

(56) References Cited

U.S. PATENT DOCUMENTS

| | | | | |
|---|---|---|---|---|
| 2022/0198296 | A1* | 6/2022 | Liu | H04L 67/52 |
| 2022/0222397 | A1 | 7/2022 | Jain et al. | |
| 2022/0224605 | A1 | 7/2022 | Jain et al. | |
| 2023/0221932 | A1* | 7/2023 | Chen | G06F 8/44<br>717/140 |

* cited by examiner

110

```
class MyTorchModule(nn.Module):
        def _omot_(self):
                Super(MyTorchModule, self)._init_()

        def forward(self, x, y):
                if torch.sum(x) > torch.sum(y):
                        return x*17
                else:
                        return y+23
```

FIGURE 1A

1100

```
program = “module”, name , “(“ , params, “)” , “:” , statement-list
identifier = <grammar for valid names of identifiers>
param = “in” | “out”, “:” , identifier
params = param*

statement = call | alloc | assignment | var-decl  | if-stmt | loop-stmt |
parallel-stmt

call = op , “(“ , identifier* ,  “)”
op =  <identifiers of predefined built-in operations>
alloc = <grammar for calling any of predefined allocation functions>
var-decl = identifier , “:“ ,  type

assignment = [identifier* ,  “,”]+ , identifier , “=“ ,  [op | var-name , “,’]+ ,
op | var-name

statement-list = statement+
type =  < predefined list of supported types e.g., int32>

if-stmt = ‘if’, identifier , then-body , else-body?
then-body =  statement-list
else-body =  ‘else’ statement*

parallel–stmt  = ‘parallel’ , statement-list

loop-stmt = ‘loop’ , identifier , loop-body
loop-body = =  statement*
```

FIGURE 11

APPARATUS AND METHODS FOR GENERATION OF AN INTERMEDIATE REPRESENTATION FOR ARTIFICIAL INTELLIGENCE CENTRIC ARCHITECTURES

CROSS-REFERENCE TO RELATED APPLICATIONS

The present application claims priority from Provisional Application 63/484,855, filed on Feb. 14, 2023, the contents of which are hereby incorporated by references.

TECHNICAL FIELD

This present disclosure generally relates to the generation of an intermediate representation of a code and more particularly to the generation of an intermediate representation of code in artificial intelligence-centric systems.

BACKGROUND

The advent of artificial intelligence (AI) solutions and AI task-specific processors provides a variety of challenges that need to be addressed, including the need to provide development and deployment support systems. Traditional compiler approaches may not provide the necessary support needed for these newly developed solutions where it is necessary to compile deep learning (DL) models that are to be executed on AI-centric architectures, where execution is performed primarily on AI pipeline-specific accelerators and does not include a central processing unit (CPU) for data movement and processing.

In one type of compiler solution, intermediate representations (IR) are used to represent the code. In some instances, this can be a machine language, or assembly language, which is then further translated into the actual machine code for each compute engine, the sequences of 1's and 0's that make up the code consumed by, for example, a CPU. In another compilation, for example, of another intermediate level, a graph is formed that comprises the data flow and control flow of a program. That graph is later compiled into, for example, the machine language. The control flow is the order in which units of computations of a program should be executed by one or more compute engines.

In multi-core architectures, passing of control to the next sequential machine code segment, e.g., function, is done by implementation of a branch instruction. The branch instruction involves the change of a program counter (PC), and as a result, a new code segment in an address pointed to by the PC is executed by the CPU. However, control flow for an AI-centric system requires a different approach than that which is used in multi-core architectures. These include the facts that an assumption cannot be made of an existence of a shared memory address space between different compute devices, and different compute devices may be using different PCs, and hence, a plurality of PCs may exist. Moreover, prior art control-flow is inherently designed only for a single-thread execution.

FIG. 1A is a prior art example of a Pytorch® module that implements an execution program or model to run on a CPU, and FIG. 1B is an example of a classical control flow IR for the Pytorch model shown in FIG. 1A. It can be readily understood that the control flow IR of the prior art assumes a common address space that exists between different devices executing the model. Furthermore, it is assumed that a single PC is used for the execution of the model. Moreover, it inherently supports a single-thread execution. The control graph is composed of sequential blocks (sequential collection of instructions). Each block ends with a branch instruction to the next sequential block. A typical compiler to perform such classical IR is the LLVM compiler. Basically, the LLVM comprises compiler and toolchain technologies. These are used in the development of a frontend to any programming language. They may be further used to develop a backend to any instruction set, i.e., machine language, and architectures.

In AI-centric architectures, each compute device may have its own architecture. Therefore, the computation may be executed by a different compute device as the execution of a program progresses. That is, the next computation is triggered by sending an explicit job request, which specifies the function to be executed, into the incoming request queue of the next device. That device may be different from the previous device.

Therefore, prior art IR cannot efficiently address the needs of a compilation of AI-centric architectures, and it would be advantageous to provide a compiler that generates an AI-centric IR.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the terms "some embodiments" or "certain embodiments" may be used herein to refer to a single embodiment or multiple embodiments of the disclosure.

In an embodiment of a method for compilation of an upper-level computer language into a control graph intermediate representation, the method comprises: receiving an input in the upper-level computer language; generating for the received input a plurality of sub-graphs, wherein a sub-graph comprises an input control node connected by a first edge to a first body sub-graph and the first body sub-graph is connected by a second edge to the output control node, and wherein the plurality of sub-graphs are connected via respective edges to form an initial intermediate representation of the control graph, wherein a control node encapsulates logic to decide on a next compute node to execute and to enqueue job requests into an input queue of a compute device to execute the next compute node; optimizing the initial intermediate representation by at least merging a first output control node connected by an edge to a second control node, thereby creating an optimized control graph intermediate representation; and storing the optimized control graph intermediate representation in a storage.

In another embodiment, a system for compilation of an upper-level computer language into a control graph intermediate representation comprises: a storage; a processing circuitry communicatively connected to the storage; a memory communicatively connected to the processing circuitry and to the storage, wherein the memory contains therein instructions that when executed by the processing circuitry cause the system to: receive an input in the upper-level computer language; generate for the received input a plurality of sub-graphs, wherein a sub-graph comprises an input control node connected by a first edge to a first body sub-graph and the first body sub-graph is connected by a second edge to the output control node, and wherein the plurality of sub-graphs are connected via respective edges to form an initial intermediate representation of the control graph, wherein a control node encapsulates logic to decide on a next compute node to execute and to enqueue job requests into an input queue of a compute device to execute the next compute node; optimize the initial intermediate representation by at least merging a first output control node connected by an edge to a second control node, thereby creating an optimized control graph intermediate representation; and store the optimized control graph intermediate representation in the storage.

In yet another embodiment, a non-transitory computer-readable medium having stored thereon instructions for causing a processing circuitry to execute a process, the process comprising: receiving an input in the upper-level computer language; generating for the received input a plurality of sub-graphs, wherein a sub-graph comprises an input control node connected by a first edge to a first body sub-graph and the first body sub-graph is connected by a second edge to the output control node, and wherein the plurality of sub-graphs are connected via respective edges to form an initial intermediate representation of the control graph, wherein a control node encapsulates logic to decide on a next compute node to execute and to enqueue job requests into an input queue of a compute device to execute the next compute node; optimizing the initial intermediate representation by at least merging a first output control node connected by an edge to a second control node, thereby creating an optimized control graph intermediate representation; and storing the optimized control graph intermediate representation in a storage.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention will be apparent from the following detailed description taken in conjunction with the accompanying drawings.

FIG. 1A is an example of a Pytorch model.

FIG. 11 is a definition of a skeleton programming language for deep-learning models.

DETAILED DESCRIPTION

Figure 1B:
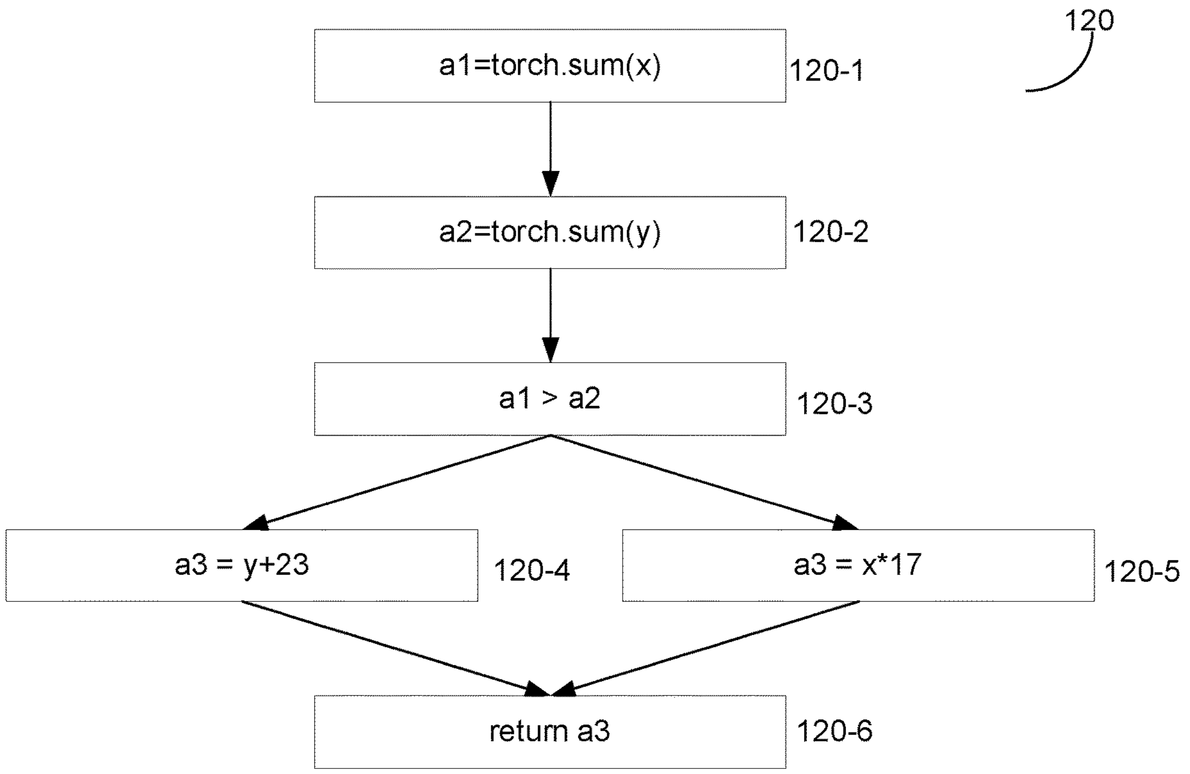
FIG. 1B is an example of a classical control flow intermediate representation for the Pytorch model.

The embodiments disclosed herein are only examples of the many possible advantageous uses and implementations of the innovative teachings presented herein. In general, statements made in the specification of the present application do not necessarily limit any of the various claimed inventions. Moreover, some statements may apply to some inventive features but not to others. In general, unless otherwise indicated, singular elements may be in plural and vice versa with no loss of generality. In the drawings, like numerals refer to like parts through several views.

As will be discussed herein, a compute graph is a graph that describes an AI pipeline and includes compute nodes and control nodes. A compiler compiles, for example, a compute graph that describes an AI pipeline, including a deep learning (DL) model for artificial intelligence (AI) centric architectures, generating a control graph intermediate representation (IR). The IR denotes compute nodes and control nodes, and edges denote the control flow between the nodes. A compute node, represented by a circle on the graph, encapsulates a computation (e.g., operation) to be executed on a compute (e.g., accelerator) device. A control node, represented by a diamond on the graph, encapsulates the logic to decide on the next compute node to execute (e.g., in case of conditional execution) and to enqueue job requests into an input queue of a compute device to execute that compute node. As execution may occur on different compute devices, the compiler is configured to operate without assuming a shared memory address space between different compute devices, making no assumption of a single program counter.

In an embodiment, the generated IR includes compute nodes. Each compute node specifies one or more device ops. Device ops are specific commands or functions that are being executed on the target compute engine (aka hardware device), such as AI accelerators. Each compute engine has its own specific set of device ops, depending on the type of device and its purpose.

Figure 2:
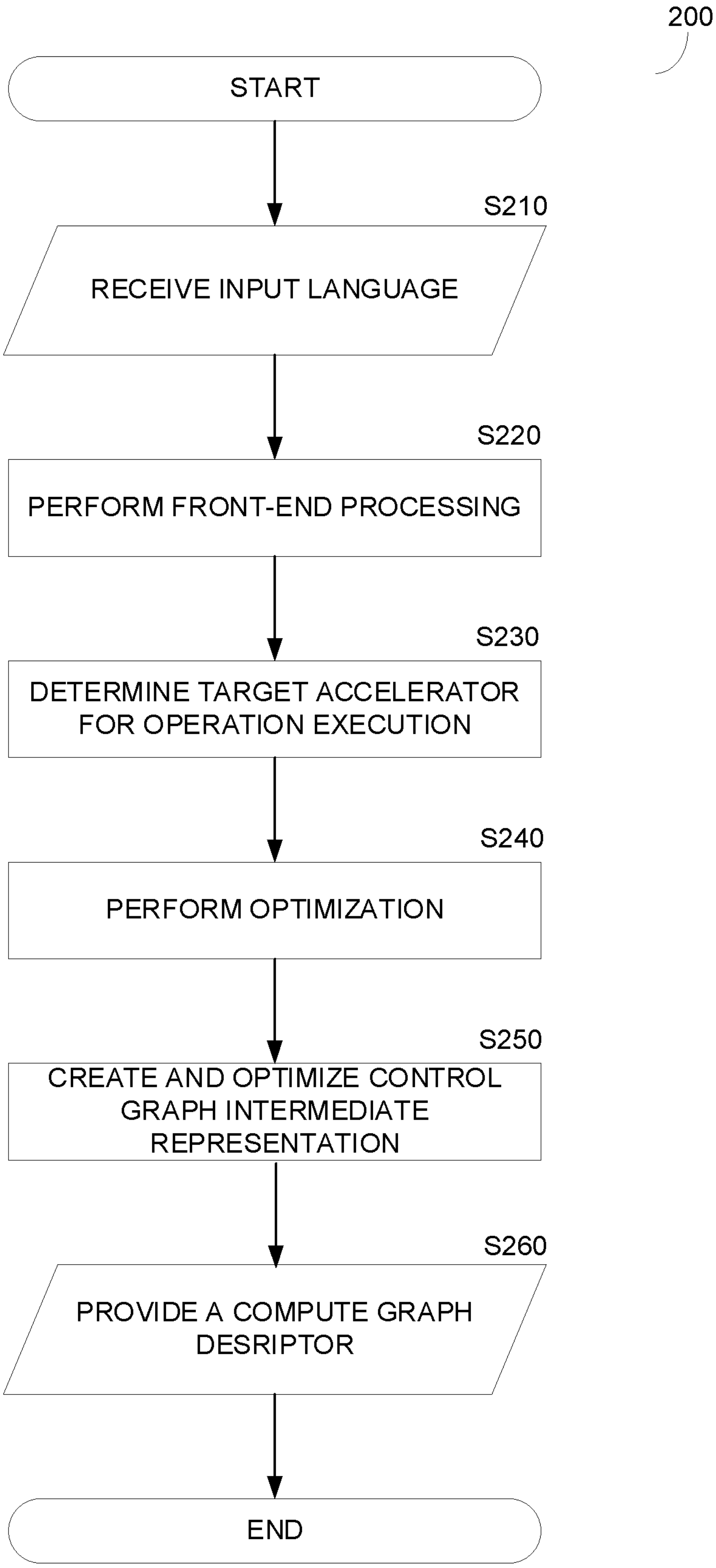
FIG. 2 is a flowchart of compilation into an intermediate representation according to an embodiment.

FIG. 2 is an example flowchart 200 of compilation into an IR according to an embodiment. The compilation may be performed on a computerized system, such as discussed for the system 900 described herein in greater detail. At S210, an input may be received in one of many types of upper-level languages. Such upper-level languages include but are not limited to, Pytorch® and TensorFlow®. The input may include, for example, a DL model for an AI-centric architecture.

At S220, front-end processing of the received input takes place. This includes, but not by way of limitation, parsing and lexical scope analysis.

At S230, the target compute devices, or accelerators, are determined. As it is recognized that in AI-centric architecture different nodes exist for the performance of particular operations, and as further discussed herein, a determination of which is to be used needs to take place. The accelerators may be determined per operation that needs to be performed.

At S240, one or more optimizations are performed. Such optimizations may include, without limitation, operation fusion, that is, the fusing of two or more different operations into a single operation, and as further explained herein. This may further include recurring computation in order to optimize sub-graphs. It should be understood that the selection of accelerators, as explained herein, can be a part of an optimization stage designed to produce an optimal graph for an AI-centric solution when considering the compute engine's (CE) capabilities, nodes' requirements, handoffs required, and decisions on tradeoffs. This may result in a decision to unify nodes, replace nodes, replace parts of the graphs, replace the CE, or partition decisions between CEs that execute this part of the graph.

At S250, an optimized compute graph (CG) descriptor, which is the control flow graph IR, is generated. The CG IR is enhanced with a full list of variables, with predefined size, e.g., tensors used by the model, to be allocated during model deployment.

Figure 3A:
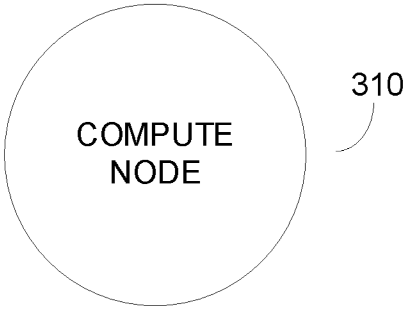
FIG. 3A is a first symbol of a compute node for the intermediate representation according to an embodiment.

The IR, according to an embodiment, may include various basic elements that are used for the description of the AI model. FIG. 3A is a first symbol 310 of a compute node for the IR, according to an embodiment. In an embodiment, the first symbol is a circle, i.e., a compute node is represented by a circle.

Figure 3B:
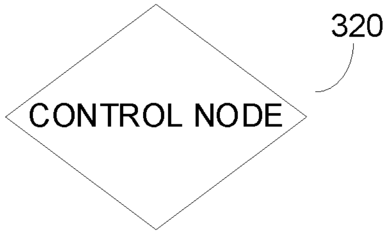
FIG. 3B is a second symbol of a control node for the intermediate representation according to an embodiment.

FIG. 3B is a second symbol 320 of a control node for the IR, according to an embodiment. In an embodiment, the second symbol is a diamond, i.e., a compute node is represented by a diamond. It should be understood that the diamond shape is suggested by no means is equivalent to a branch of prior art solutions. Rather, this is a control function that may have one or more edges output therefrom, and as further discussed herein.

Figure 3C:
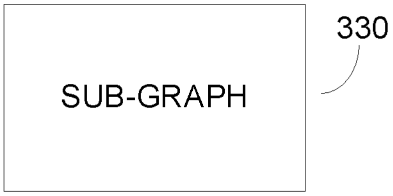
FIG. 3C is a third symbol of a sub-graph for the intermediate representation according to an embodiment.

FIG. 3C is a third symbol 330 of a sub-graph of the IR, according to an embodiment. In an embodiment, the third symbol is a rectangle, i.e., a sub-graph is represented by a rectangle.

Figure 3D:
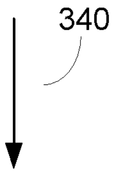
FIG. 3D is a fourth symbol of an edge for the intermediate representation according to an embodiment.

FIG. 3D is a fourth symbol 340 of an edge for the IR, according to an embodiment. In an embodiment, the fourth symbol is a line ending with an arrow also referred to as an edge, i.e., an edge 340 is represented by a line ending with an arrowhead. That is, an edge 340 represents control-flow from a source to a destination.

Figure 4A:
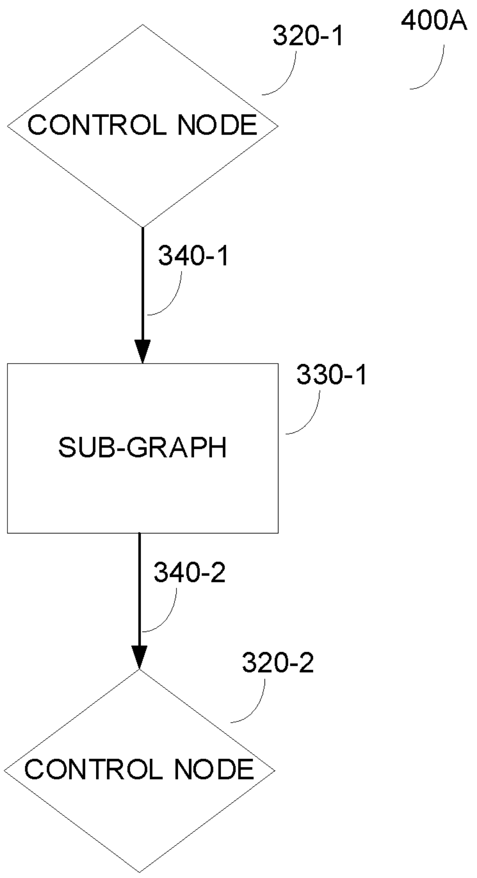
FIG. 4A is a subgraph of the intermediate representation connected to an input control node and an output control node providing an intermediate representation according to an embodiment.

FIG. 4A depicts subgraph 330-1 of the intermediate representation connected to an input control node 320-1 and an output control node 320-2 providing an IR 400A according to an embodiment. The input control node 320-1 is connected to subgraph 330-1 by edge 340-1. The sub-graph 330-1 is connected to the output control node 320-2 by edge 340-2. A sub-graph always has one start control node, e.g., control node 320-1, and one end control node, e.g., control node 320-2.

Figure 4B:
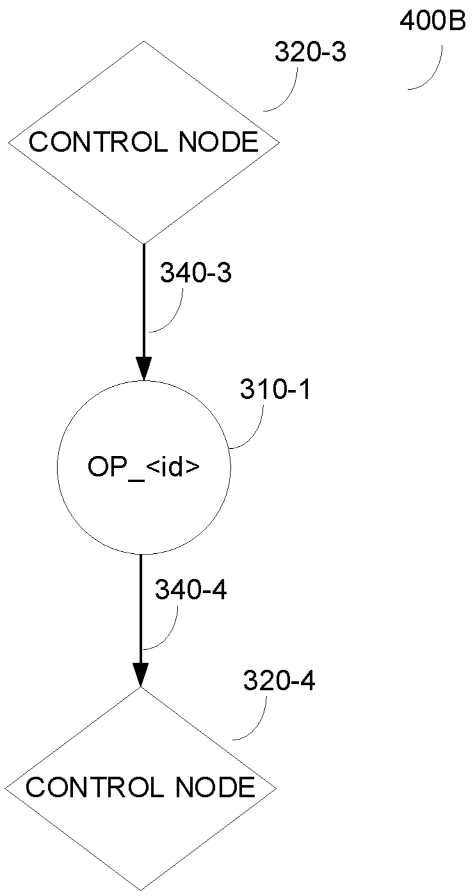
FIG. 4B is an operation node connected to an input control node and an output control node providing an intermediate representation according to an embodiment.

FIG. 4B is an operation node 310-1 connected to an input control node 320-3 and an output control node 320-4 providing an IR 400B according to an embodiment. The input control node 320-3 is connected to operation node 310-1 by edge 340-3. The operation node 310-1 is connected to the output control node 320-4 by edge 340-4. A sub-graph always has one start control node, e.g., control node 320-1, and one end control node, e.g., control node 320-4. A call to an operation node is mapped into a single compute node. According to an embodiment, two new control nodes, e.g., control nodes 320-3 and 320-4, are added, as well as corresponding edges, e.g., edges 340-3 and 340-4. Furthermore, according to an embodiment, a unique identification (ID or id) is added to each compute node. In an embodiment, the ID is used to identify the exact kernel that is designated to execute an op on a specific target accelerator.

Several examples flow in FIGS. 5-8 of IRs for various input upper-level language code received by the compiler according to an embodiment. These are meant to provide an illustration of the operation of such a compiler when executed on an appropriate apparatus, for example, a compiling platform. An example of such a platform is provided in FIG. 9.

Figure 5:
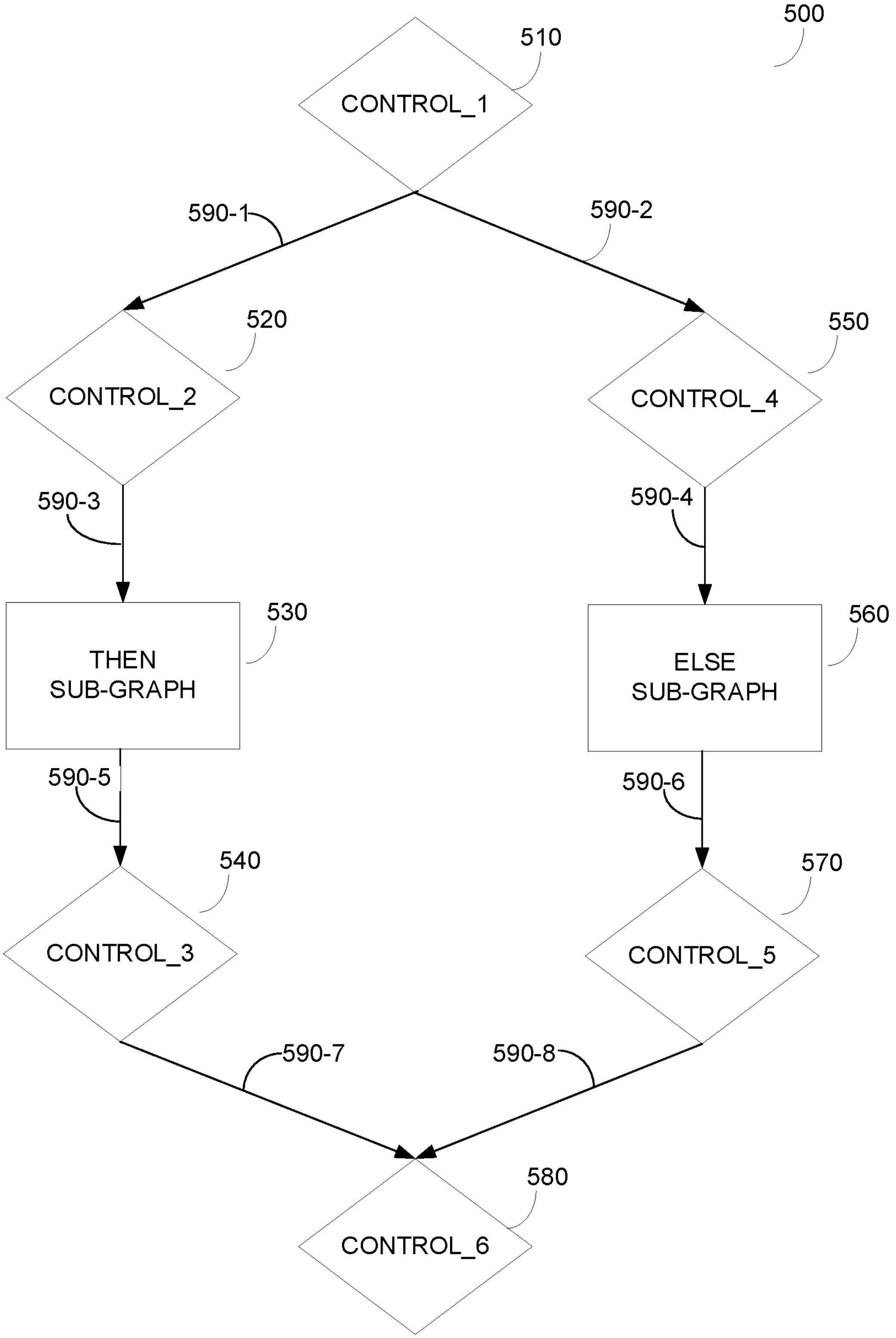
FIG. 5 is an if-else statement in an intermediate representation according to an embodiment.

FIG. 5 is an example of an if-else statement in an IR 500 according to an embodiment. The source code for such a statement, at a high-level language, may be as follows:

```
If cond-var
  then-block
  else-block
```

When compiled into machine language, the code may be represented as follows:

```
mvtr r0,0, cond-var
cmp r0,0
beq 3
call control_2
and
call control_4
```

The mvtr instruction stands for move tensor to register. It is an administrative operation designed to enable successive operations inside the control program to work on registers, as is common with conventional CPUs. The cmp is a compare instruction, and the beq is a branch on equal instruction, which are standard administrative operations on registers, as is common with conventional CPUs. The number '3' that follows the beq means the number of instructions to jump forward. The call <op> is a complex operation that creates a "job request" to execute a specific next compute node. It enqueues the "job request" into an input queue of the compute device (e.g., an accelerator) selected for a particular operation (op). That is done, according to an embodiment, during compilation (in earlier stages) and provisioning phases of deployment, and as further discussed herein. It should be understood that this is the code for control_1 of the example of FIG. 5, while other control nodes have their particular code that suits their execution needs.

According to an embodiment, then-statements, and else-statements below are compiled into corresponding sub-graphs. In this case, the then-statement comprises control_2 520, then sub-graph 530, and control_3 540. Then, sub-graph 530 contains the statements for the then portion. The else-statement comprises control_4 550, else sub-graph 560, and control_5 570. The else sub-graph 560 contains therein the statements for the else portion. According to an embodiment, there are added an input control node, e.g., control_1 510, and an output control node, e.g., control_6 580. Corresponding edges 590, for example, edges 590-1 through 590-8, connect the graph elements as is appropriate for the case. For example, from control_1 there is an edge 590-1 connecting to control_2 520 and an edge 590-2 connecting to control_4 550. An edge 590-3 connects control_2 520 to the then sub-graph 530, and so on. It should be noted that control_3 540, which is connected to control_6 580 via edge 590-7, represents a call control_6, which is added to adhere with the IR according to an embodiment. Similarly, control_5 570, that is connected to control_6 580 via edge 590-8, also represents a call control_6 which is added to adhere with the IR according to an embodiment.

Figure 6:
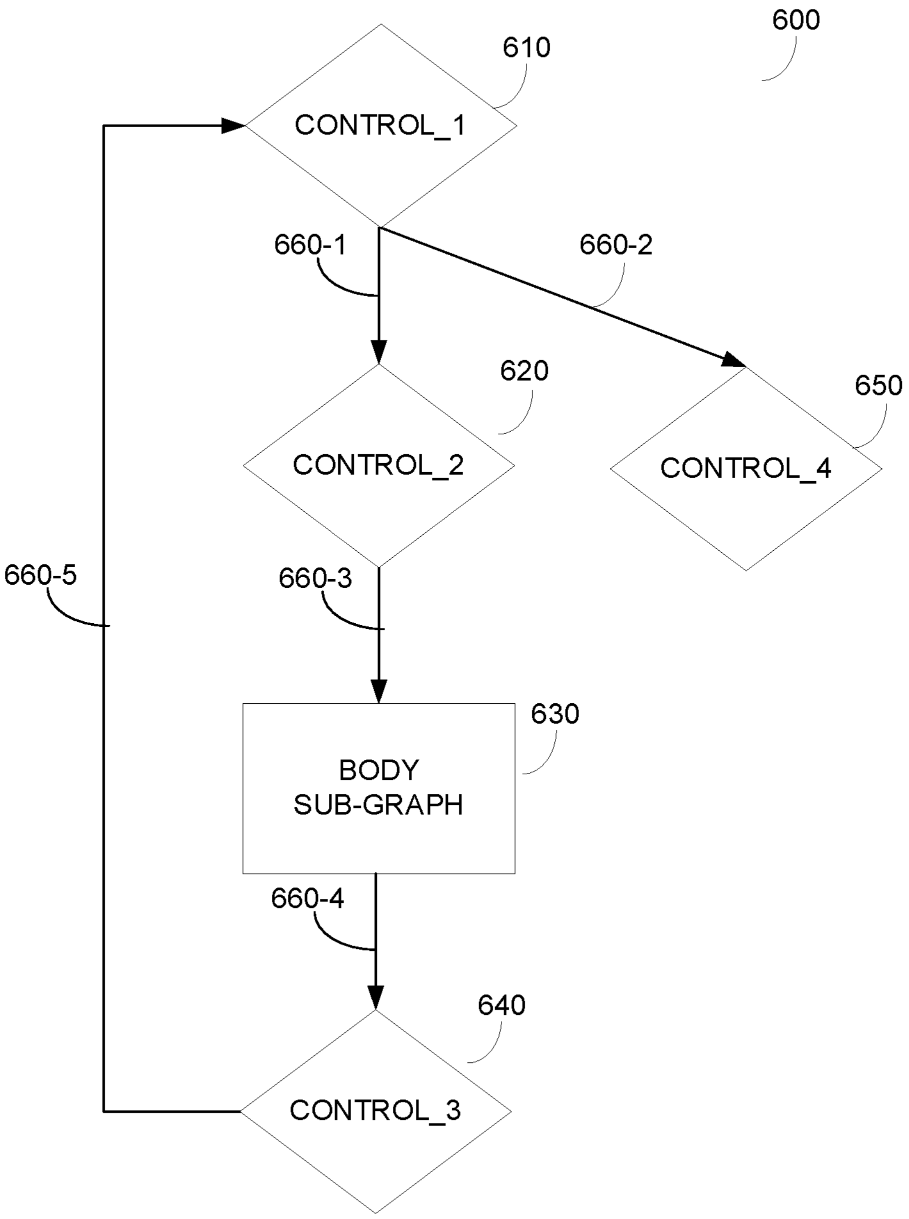
FIG. 6 is a loop statement in an intermediate representation according to an embodiment.

FIG. 6 is an example loop statement in an IR 600 according to an embodiment. The source code for such a statement, at a high-level language, may be as follows:

```
Loop cond-var
    Body-block
```

When compiled into machine language, the code may be represented as follows:

```
mvtr r0,0, cond-var
cmp r0,0
beq 3
call control_2
end
call control_4
```

The descriptions for machine language instructions mvtr, cmp, and beq are as described hereinabove and therefore not repeated here for the sake of conciseness. According to an embodiment, the body-block instructions are compiled into corresponding body sub-graph 630. The body sub-graph 630 is connected by an edge 660-3 to control_2 620 and by edge 660-4 to control_3 640. The loop is performed by the execution of the edge 660-5 that connects back to control_1 610. Control_1 610 and control_4 650 are added as input and output of the loop as when compiled according to an embodiment. Control_1 610 is connected by edge 660-1 to control_2 620. Control_1 610 is further connected to control_4 650 by edge 660-2, providing for the exit condition from the loop. It should be understood that this is the code for control_1 of the example of FIG. 6, while other control nodes have their particular code that suits their execution needs.

Figure 7:
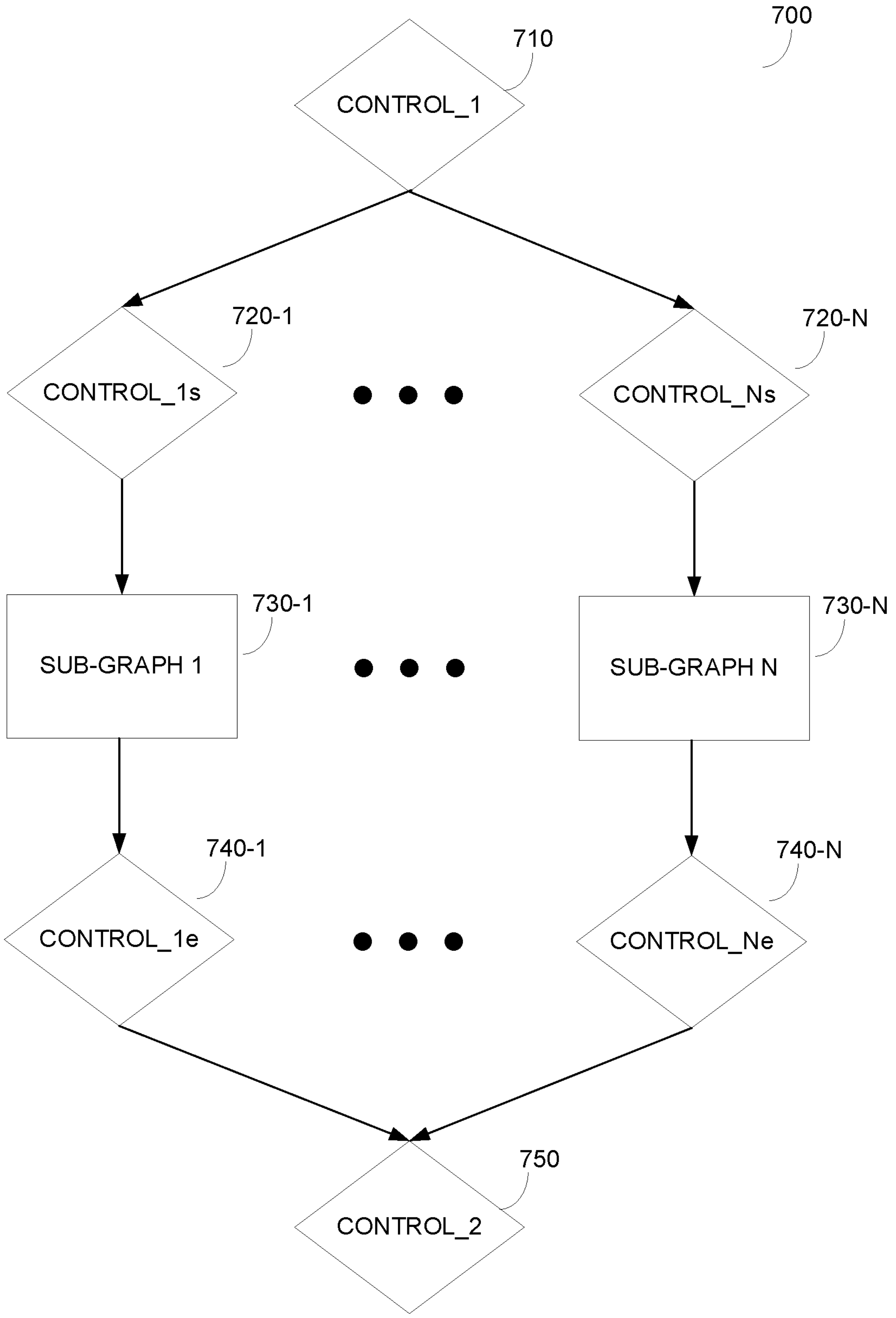
FIG. 7 is a parallel statement in an intermediate representation according to an embodiment.

FIG. 7 is an example parallel statement in an IR 700 according to an embodiment. At the machine level, this may be shown as a series of call functions as follows:

```
call . . . control_1s
call . . . control_2s
. . .
call . . . control_Ns
```

As in AI-centric architectures, these calls may be executed in parallel, and furthermore on compute nodes that are different from each other, the IR 700 provides for a parallelism capability. An input control node control_1 710 and an output control node control_2 750 are added by the compiler. A plurality of sub-graphs, for example, sub-graphs 730-1 through 730-N, where N is an integer greater than '1', are generated by the compiler according to an embodiment, containing therein inner statement-lists (not shown). Each sub-graph 730 is connected to a start control node 720, for example, start control node control_1s 720-1 through control_Ns 720-N and connected to the corresponding sub-graph by a corresponding edge. Similarly, each sub-graph 730 is connected to an end control node 740, for example, end control node control_1e 740-1 through control_Ne 740-N and connected to the corresponding sub-graph by a corresponding edge. Each of the start control nodes 720 is connected to the input control node control_1 710 by a corresponding edge. Each of the end control nodes 740 is connected to the output control node control_2 750 by a corresponding edge. It should be understood that a parallel statement shown as IR 700 completes execution only after all its inner statements complete execution.

It should be further noted that each of control_1e 740-1 through control_Ne 740-N, corresponds to a call statement call control_2. It should be understood, therefore, that control_1 710 activates control_1s 720-1, control_2s 720-2 (not shown), . . . control_Ns 720-N, without waiting for the completion of each of the associated sub-graphs 730-1, 730-2 (not shown), . . . 730-N. This allows for the parallel execution of these subgraphs 730, each executing on one or more different compute nodes as the case may require, and once it completes its execution, it transfers to its corresponding control node, for example, control_1e 740-1, control_2e 740-2 (not shown), . . . and control_Ne 740-N. This may happen at different times, i.e., this is asynchronous for each of the subgraphs 730. Each of the end control nodes 740 reverts to control_2 750 and considers this parallel execution complete only once all the end control nodes have transferred control thereto. This graph can be optimally executed on the hardware with AI-centric capabilities, i.e., execute the nodes in parallel engines and have a set of queues and schedulers that allow for the exchange of data and metadata of the job for the executing CEs. It is further designed to allow either asynchronous or synchronous coordination of the results according to the required stage of the node.

Figure 8:
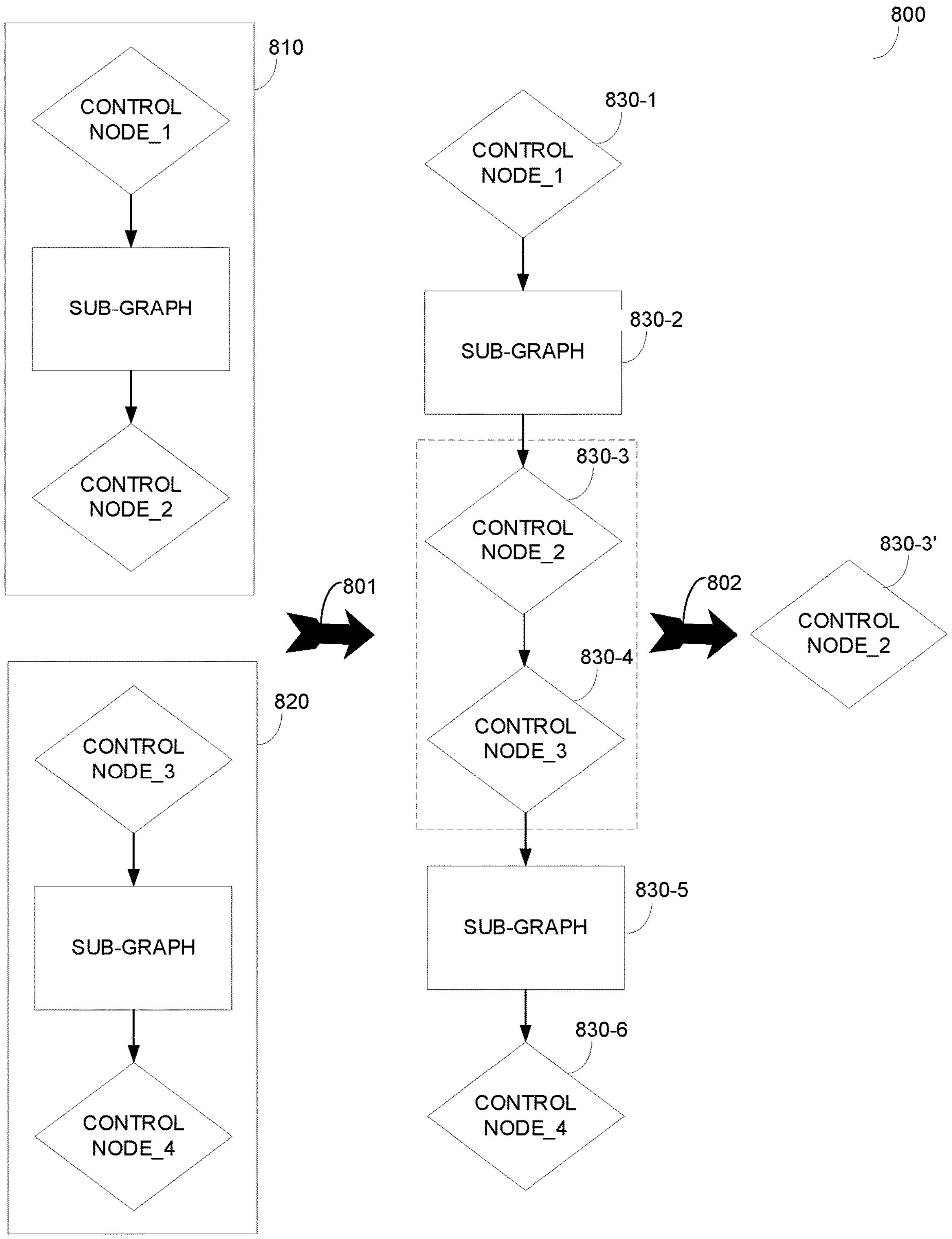
FIG. 8 is a statement list compilation in an intermediate representation according to an embodiment.

FIG. 8 is an example statement list compilation in an IR 800 according to an embodiment. In this case, there is a first sub-graph 810 and a second sub-graph 820. Each sub-graph contains therein compiled statement-lists. In an embodiment, the two sub-graphs 810 and 820 are executing one after the other, and therefore, a compilation merge 801 may take place. For example, control_node_1 830-1 is connected by an edge to sub-graph 830-2, which in turn is connected by an edge to control_node_2 830-3. This represents sub-graph 810. Similarly, control_node_3 830-4 is connected by an edge to sub-graph 830-5, which in turn is connected by an edge to control_node_4 830-6. This represents sub-graph 820. To connect sub-graphs 810 and 820, an edge connects between control_node_2 830-3 and control_node_4 830-4. Now, control_node_2 830_3 contains call control_node 3. In an embodiment, control_node_2 and control_node_3 may be concatenated into one control node, removing this call instruction. This is an optimization 802 of the IR 800, where a single control node replaces two control nodes. The newly created 830-3' combines and merges subgraph 830-2 and sub-graph 830-5, and therefore its associated control program shall differ from the code in control_node_2 830-3.

Figure 9:
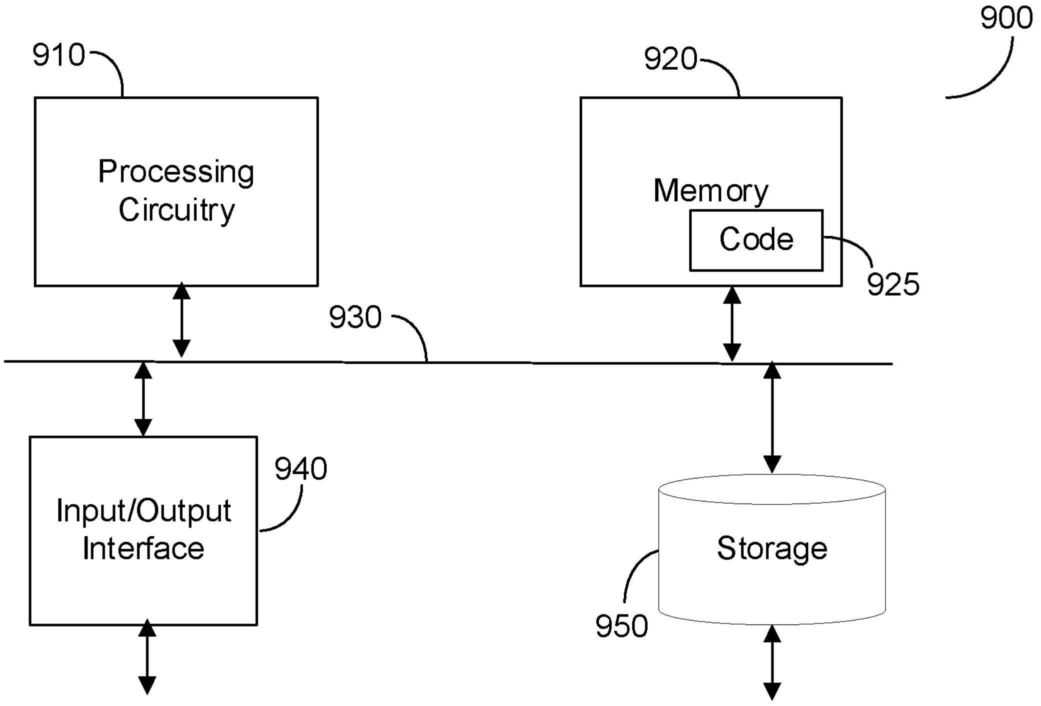
FIG. 9 is a schematic block diagram of a compiler platform for the generation of an intermediate representation for artificial intelligence-centric architectures according to an embodiment.

FIG. 9 is a schematic block diagram of a compiler platform 900 for the generation of an IR for AI-centric architectures according to an embodiment. The compiler platform 900 includes a processing circuitry 910 that is communicatively connected by a bus 930 to a memory 920. The memory 920 may further contain therein a portion that is dedicated to memory code 925. An input/output (IO) interface 940 is communicatively connected to the processing circuitry 910 using bus 930. In an embodiment, a storage unit 950 may be further communicatively connected to bus 930.

The processing circuitry 910 may be realized as one or more hardware logic components and circuits. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), general-purpose microprocessors, microcontrollers, digital signal processors (DSPs), and the like, whether general purpose or specialized processors, or any other hardware logic components that can perform calculations or other manipulations of information. The processing circuitry 910 is configured to perform a compilation of an upper-level language received by the compiler platform 900 and generate through, for example, but not by way of limitation, execution of instructions, an IR of the received upper-level language, and as further described herein. In an embodiment, processing circuitry 910 provides for parallel processing by allowing various components of the processing circuitry 910 to operate in parallel by, for example, but not by way of limitation, operation in parallel of a plurality of general-purpose microprocessors, or parallel processing by a mix of different types of circuits.

The memory 920 may be volatile, e.g., random access memory (RAM), etc., non-volatile, e.g., read-only memory (ROM), flash memory, cache memory, tightly coupled memory (TCM), etc., or any permissible combinations thereof. In one configuration, computer-readable instructions that implement one or more embodiments disclosed herein may be stored in memory code 925. These instructions are executed by the processing circuitry 910. In another embodiment, some or all of the computer-readable instructions to implement one or more embodiments disclosed herein may be stored in storage 950.

In another embodiment, the memory 920 is configured to store software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by one or more processors, cause the processing circuitry 910 to perform the various processes described herein. Specifically, the instructions, when executed, cause the processing circuitry 910 to perform the embodiments described herein.

The IO interface 940 allows the compiler platform 900 to communicate at least with the servers and clients. The IO interface 940 may be an interface to a local area network (LAN), a wide area network (WAN), the Internet, a cloud network, a cellular network, a metropolitan area network (MAN), a wired network, a wireless network, an Internet of Things (IoT) network, like networks, or any permissible combinations thereof. In an embodiment, the IO interface 940 provides for connectivity to IO devices, including the likes of a keyboard, a mouse, a monitor, a printer, and peripheral devices commonly used in connection with a compiler platform 900.

The storage 950 may be magnetic storage, optical storage, and the like, and may be realized, for example, as flash memory, for example in the case of solid-state disk (SSD) or other memory technology, CD-ROM, Digital Versatile Disks (DVDs), or any other medium which can be used to store the desired information, as well as any permissible combinations thereof.

It should be understood that the embodiments described herein are not limited to the specific architecture illustrated in FIG. 9, and other architectures may be equally used without departing from the scope of the disclosed embodiments. As a non-limiting example, compiler platform 900 may include an AI-centric architecture such as discussed, for example, in US Patent Application 17/01818,628 assigned to the common assignee, and it is hereby incorporated by reference.

Figure 10:
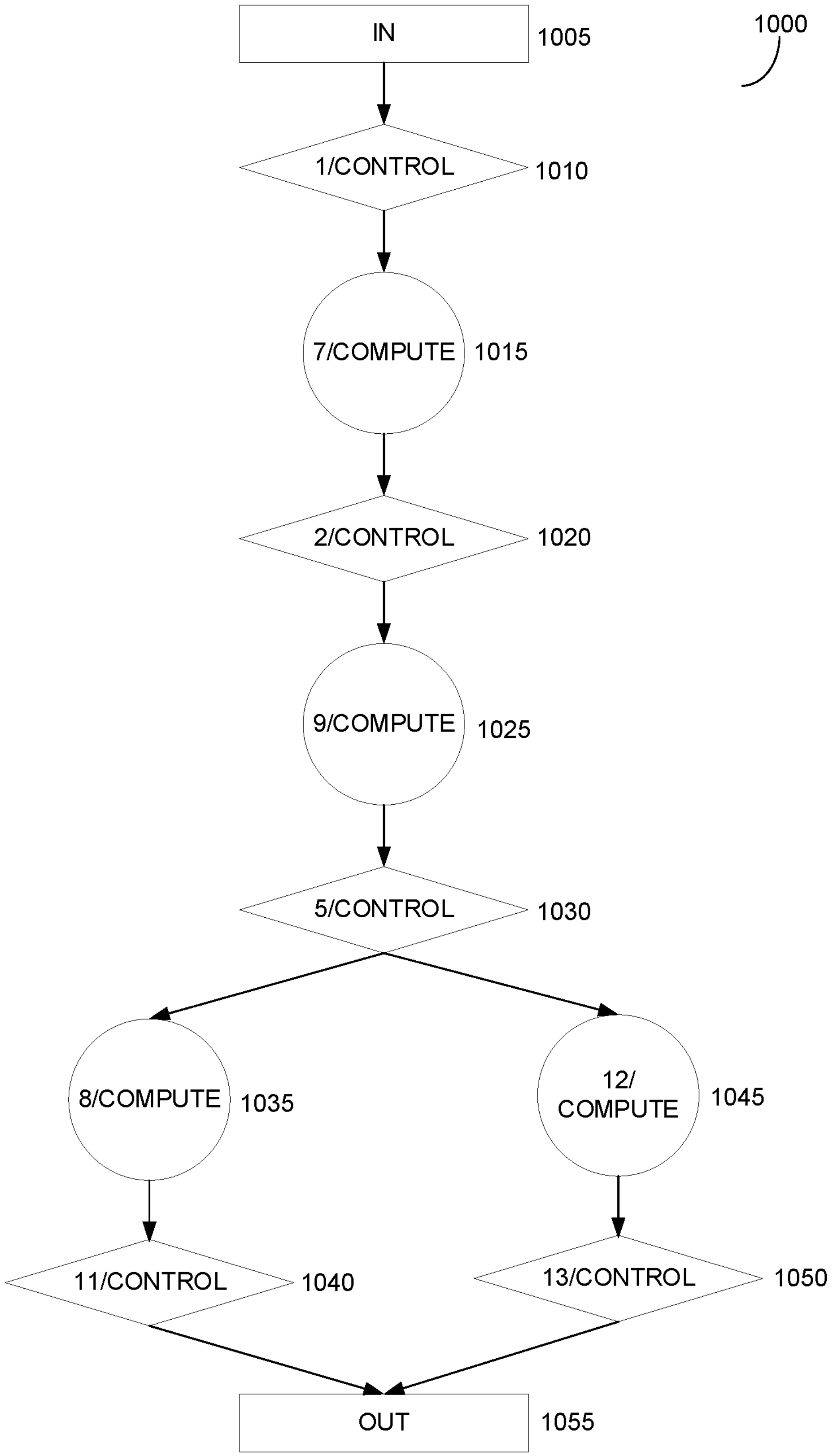
FIG. 10 is an intermediate representation of the example Pytorch model according to an embodiment.

FIG. 10 is an IR 1000 of the example Pytorch model according to an embodiment. As noted, FIG. 1A depicts an example of a Pytorch model, and FIG. 1B shows an example of a classical control flow intermediate representation for the Pytorch model. According to an embodiment, IR 1000 is shown after optimization as duplicate control nodes have been removed, i.e., merged, based on the information provided herein. While the Pytorch model is referenced herein, it should not be viewed as limiting upon the invention, which is intended to include, without limitations, any programming framework model.

At 1005, the upper-level language program is provided, in this case, the code provided in FIG. 1A. As this was already previously described, it is not repeated herein.

The input control node 1010 receives the input for transfers to the first compute node 1015.

The first compute node, 1015, is tasked with the operation torch.sum(x). The output is provided to the control node 1020.

The control node 1020 directs the output of the compute node 1015 to the input of the compute node 1025. In an embodiment, this control node 1030 is optimized from two control nodes: the output control node of the compute node 1015 and the input control node of the compute node 1025. See, for example, the merge and optimization described in FIG. 8.

The second compute node, 1025, is tasked with the operation torch.sum(y). The output is provided to the control node 1030.

The control node 1030 directs the output of the compute node 1025 to the input of one of the compute nodes 1035 and 1045. In an embodiment, this control node 1030 is optimized from two control nodes: the output control node of the compute node 1025 and the input control node of the compute nodes 1035 and 1045. See, for example, FIG. 5 for the if-else statement and the merge and optimization described in FIG. 8.

To further understand the control program of control node 1030, consider the following control program that checks the output value of the previous computation and decides on the next computation to execute.

```
{
  // move tensor value to register r0
  // "main_0/out_tensor/0 holds the condition value
  mvtr r0,0, "main_0/out_tensor/0"
  cmp r0,0
beq r0, 3//jump 3 commands forward if r0==0;
call "8/compute" // go to x*17
end
call "12/compute" // go to y+23
end
```

Hence, it should be understood, and as previously noted, that the control node, those using a diamond symbol herein, is not meant to be a regular decision block as in traditional computing. Rather, it is a control block that decides and activates where to direct an operation, noting that it may direct control to more than a single target, as shown, for example, in FIG. 7.

Compute node 1045 performs the computation y+23.

Compute node 1035 performs the computation x*17.

In an embodiment, the tensor.sum(x) compute node 1015 and tensor.sum(y) compute node 1025 may be executed in parallel. However, for reasons of clarity, only the sequential case is shown. This should not be viewed as limiting upon the scope of the disclosure herein.

The output of compute node 1035 is directed to control node 1040, which provides the result to out 1055.

The output of compute node 1045 is directed to control node 1050, which provides the result to out 1055.

Hence, according to the disclosed embodiments, described herein, the IR compiler does not assume shared-memory address space between different compute devices. It is, therefore, particularly suitable for compiling IRs for AI-centric architectures. More specifically, as the AI-centric architectures, but not only these kinds of architectures, may comprise multi-chip platforms, there is no assumption that a single program counter, as used in prior art IRs, is being used. Furthermore, and as shown herein, the IR compiler naturally supports composite control-flow (e.g., parallelism). It should be further noticed that the teachings herein may be applied in connection with other computing architectures, and in particular, such architectures having various degrees of parallelism.

While Pytorch and TensorFlow were mentioned as potential programming languages for DL models, the IR compiler disclosed herein is not limited to such programming languages. FIG. 11 provides a non-limiting example definition of a skeleton programming language 1100 for deep-learning models. The skeleton programming language 1100 may be used as a basis for the development of other like languages and is provided to emphasize the agility of the IR compiler disclosed herein.

It should be further noted that the input language may comprise various operations (or ops for short). The ops are targeted for execution on different accelerators and/or devices of the execution platform and may be built-in or user-defined. A built-in operation is a part of, for example, the firmware or libraries loaded onto different accelerators or devices of the execution platform. The built-in ops may be invoked by using calling conventions as may be applicable. User-defined ops are developed by the user, compiled into their target devices with native compilers, then added to software and/or firmware libraries of a target device or accelerator. It should be noted that the compiler that generates the IR, according to the embodiments described herein, deals with the generation of compute nodes for these ops and determines their target devices. Further, the compiler allows for adapting and matching the graph against these ops.

In an embodiment, an op may represent another independent program, for example, but not by way of limitation, a model, in the context of deep learning. This allows for the creation of an ensemble of programs, e.g., one or more AI DL models. Each of these models may be programmed in a different language, e.g., PyTorch, TensorFlow, etc., provided these languages comply with the skeleton programming language and then are separately compiled with a compiler for the IR. Thereafter, the generated IRs can be linked into a single CG descriptor for the main program.

The various embodiments disclosed herein can be implemented as hardware, firmware, software, or any combination thereof. Moreover, the software is preferably implemented as an application program tangibly embodied on a program storage unit or computer-readable medium consisting of parts or of certain devices and/or a combination of devices. The application program may be uploaded to and executed by a machine comprising any suitable architecture. Preferably, the machine is implemented on a computer platform having hardware such as one or more central processing units ("CPUs"), memory, and input/output interfaces. The computer platform may also include an operating system and microinstruction code. The various processes and functions described herein may be either part of the microinstruction code or part of the application program or any combination thereof, which may be executed by a CPU, whether or not such a computer or processor is explicitly shown. In addition, various other peripheral units may be connected to the computer platform, such as an additional data storage unit and a printing unit. Furthermore, a non-transitory computer-readable medium is any computer-readable medium except for a transitory propagating signal.

All examples and conditional language recited herein are intended for pedagogical purposes to aid the reader in understanding the principles of the disclosed embodiment and the concepts contributed by the inventor to further the art and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

As used herein, the phrase "at least one of" followed by a listing of items means that any of the listed items can be utilized individually, or any combination of two or more of the listed items can be utilized. For example, if a system is described as including "at least one of A, B, and C," the system can include A alone, B alone; C alone; 2A; 2B; 2C; 3A; A and B in combination; B and C in combination; A and C in combination; A, B, and C in combination; 2A and C in combination; A, 3B, and 2C in combination; and the like.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

What is claimed is:

1. A method for compilation of an upper-level computer language into a control graph intermediate representation, the method comprises:

receiving an input in the upper-level computer language;

generating for the received input a plurality of sub-graphs, wherein each sub-graph comprises an input control node connected by a first edge to a first body sub-graph and the first body sub-graph is connected by a second edge to a output control node, and wherein the plurality of sub-graphs are connected via respective edges to form an initial intermediate representation of the control graph, wherein a control node encapsulates logic to decide on a next compute node to execute and to enqueue job requests into an input queue of a compute device to execute the next compute node;

optimizing the initial intermediate representation by at least merging a first output control node connected by an edge to a second control node, thereby creating an optimized control graph intermediate representation; and storing the optimized control graph intermediate representation in a storage;

wherein a first sub-graph of the plurality of sub-graphs further comprises at least one compute node and a second sub-graph of the plurality of sub-graphs further comprises at least one compute node;

wherein the at least one compute node of the first sub-graph of the plurality of sub-graphs uses a different shared-memory address space than the at least one compute node of the second sub-graph of the plurality of sub-graphs.

2. The method of claim 1, wherein a compute node of at least one sub-graph of the plurality of sub-graphs uses a different program counter than at least one compute node of a sub-graph of the plurality of sub-graphs other than the at least one sub-graph.

3. The method of claim 1, wherein a compute node of at least one sub-graph of the plurality of sub-graphs executes in parallel to a compute node of a sub-graph of the plurality of sub-graphs other than the at least one sub-graph.

4. The method of claim 1, wherein the input control node is connected to a second body sub-graph.

5. The method of claim 1, wherein each of the first body sub-graph and a second body sub-graph are executed in parallel.

6. The method of claim 1, wherein an input control node is configured to perform one of: if-else statement, loop-statement, and parallel execution statement.

7. The method of claim 1, wherein a first symbol is used for the control node, a second symbol for the compute node, a third symbol for the edge, and a fourth symbol for program control.

8. The method of claim 1, further comprising:

frontend processing of the received input.

9. The method of claim 1, further comprising:

optimizing the optimized control graph intermediate for execution on an artificial intelligence (AI) centric architecture.

10. A system for compilation of an upper level computer language into a control graph intermediate representation, the system comprises:

a processing circuitry communicatively connected to a storage;

a memory connected to the processing circuitry, wherein the memory contains therein instructions that when executed by the processing circuitry cause the system to:

receive an input in an upper-level computer language;

generate for the received input a plurality of sub-graphs, wherein each sub graph comprises an input control node connected by a first edge to a first body sub-graph and the first body sub-graph is connected by a second edge to a output control node, and wherein the plurality of sub-graphs are connected via respective edges to form an initial intermediate representation of the control graph, wherein a control node encapsulates logic to decide on a next compute node to execute and to enqueue job requests into an input queue of a compute device to execute the next compute node;

optimize the initial intermediate representation by at least merging a first output control node connected by an edge to a second control node, thereby creating an optimized control graph intermediate representation; and store the optimized control graph intermediate representation in the storage;

wherein a first sub-graph of the plurality of sub-graphs further comprises at least one compute node and a second sub-graph of the plurality of sub-graphs further comprises at least one compute node;

wherein the at least one compute node of the first sub-graph of the plurality of sub-graphs uses a different shared-memory address space than the at least one compute node of the second sub-graph of the plurality of sub-graphs.

11. The system of claim 10, wherein a compute node of at least one sub-graph of the plurality of sub-graphs uses a different program counter than at least one compute node of a sub-graph of the plurality of sub-graphs other than the at least one sub-graph.

12. The system of claim 10, wherein a compute node of at least one sub-graph of the plurality of sub-graphs executes in parallel to a compute node of a sub-graph of the plurality of sub-graphs other than the at least one sub-graph.

13. The system of claim 10, wherein the input control node is connected to a second body sub-graph.

14. The system of claim 10, wherein each of the first body sub-graph and a second body sub-graph are executed in parallel.

15. The system of claim 10, wherein an input control node is configured to perform one of: if-else statement, loop-statement, and parallel execution statement.

16. The system of claim 10, wherein a first symbol is used for the control node, a second symbol for the compute node, a third symbol for the edge, and a fourth symbol for a program control.

17. The system of claim 10, wherein the system is further configured to: perform frontend processing of the received input.

18. The system of claim 10, wherein the system is further configured to: optimize of the optimized control graph intermediate for execution on an artificial intelligence (AI) centric architecture.

19. A non-transitory computer readable medium having stored thereon instructions for causing a processing circuitry to execute a process, the process comprising:

receiving an input in an upper-level computer language;

generating for the received input a plurality of sub-graphs, wherein each sub graph comprises an input control node connected by a first edge to a first body sub-graph and the first body sub-graph is connected by a second edge to a output control node, and wherein the plurality of sub-graphs are connected via respective edges to form an initial intermediate representation of the control graph, wherein a control node encapsulates logic to decide on a next compute node to execute and to enqueue job requests into an input queue of a compute device to execute the next compute node;

optimizing the initial intermediate representation by at least merging a first output control node connected by an edge to a second control node, thereby creating an optimized control graph intermediate representation; and, storing the optimized control graph intermediate representation in a storage;

wherein a first sub-graph of the plurality of sub-graphs further comprises at least one compute node and a second sub-graph of the plurality of sub-graphs further comprises at least one compute node;

wherein the at least one compute node of the first sub-graph of the plurality of sub-graphs uses a different shared-memory address space than the at least one compute node of the second sub-graph of the plurality of sub-graphs.

* * * * *